United States Patent [19]

Bjerkoy

[11] Patent Number: 5,157,636
[45] Date of Patent: Oct. 20, 1992

[54] METHOD OF TOWING SOURCES OF SEISMIC ENERGY BEHIND A VESSEL, AND AN ARRANGEMENT FOR USE IN THE METHOD

[75] Inventor: Rolf Bjerkoy, Melsomvik, Norway
[73] Assignee: Geco A.S., Stavanger, Norway
[21] Appl. No.: 682,084
[22] Filed: Apr. 9, 1991
[30] Foreign Application Priority Data
  Apr. 9, 1990 [NO] Norway .................. 901617
[51] Int. Cl.⁵ .............................................. G01V 1/38
[52] U.S. Cl. .................................. 367/15; 367/16; 367/106; 367/144; 181/110; 114/244; 114/245
[58] Field of Search ................ 367/15, 16, 17, 18, 367/106, 142, 144; 181/110; 114/244, 245, 253, 254

[56] References Cited

U.S. PATENT DOCUMENTS

| 2,610,240 | 9/1952 | Pottorf | 114/245 |
| 3,437,987 | 4/1969 | Burg | 367/16 |
| 3,496,526 | 2/1970 | Rockwell | 367/16 |
| 4,748,599 | 5/1988 | Gjestrum et al. | 367/17 |
| 4,984,218 | 1/1991 | Ritter et al. | 367/15 |

Primary Examiner—J. W. Eldred
Attorney, Agent, or Firm—Fleit, Jacobson, Cohn, Price, Holman & Stern

[57] ABSTRACT

In towing sources of seismic energy behind a vessel, especially in connection with seismic surveys in waters which are covered with ice, the buoyancy floats and also the sources of seismic energy are readily influenced by broken up ice collecting behind the icebreaking towing vessel. In order to stabilize the tow of sources of seismic energy a towing line (7) is secured between the buoyancy means (4) belonging to the tow of sources of energy (3) and the vessel (1) at a point (10) which is located in the area of the waterline, so that towing line (7) will extend in the area of the waterline. Another towing line (8) is connected directly with the array of sources of seismic energy (5) and is secured to a towing point (11) on the vessel (1) located below the waterline. An arrangement is also disclosed for securing the towing line (8) in a suitable location to avoid influence from ice and, furthermore, the design of floats (4) avoids influence from the ice.

20 Claims, 1 Drawing Sheet

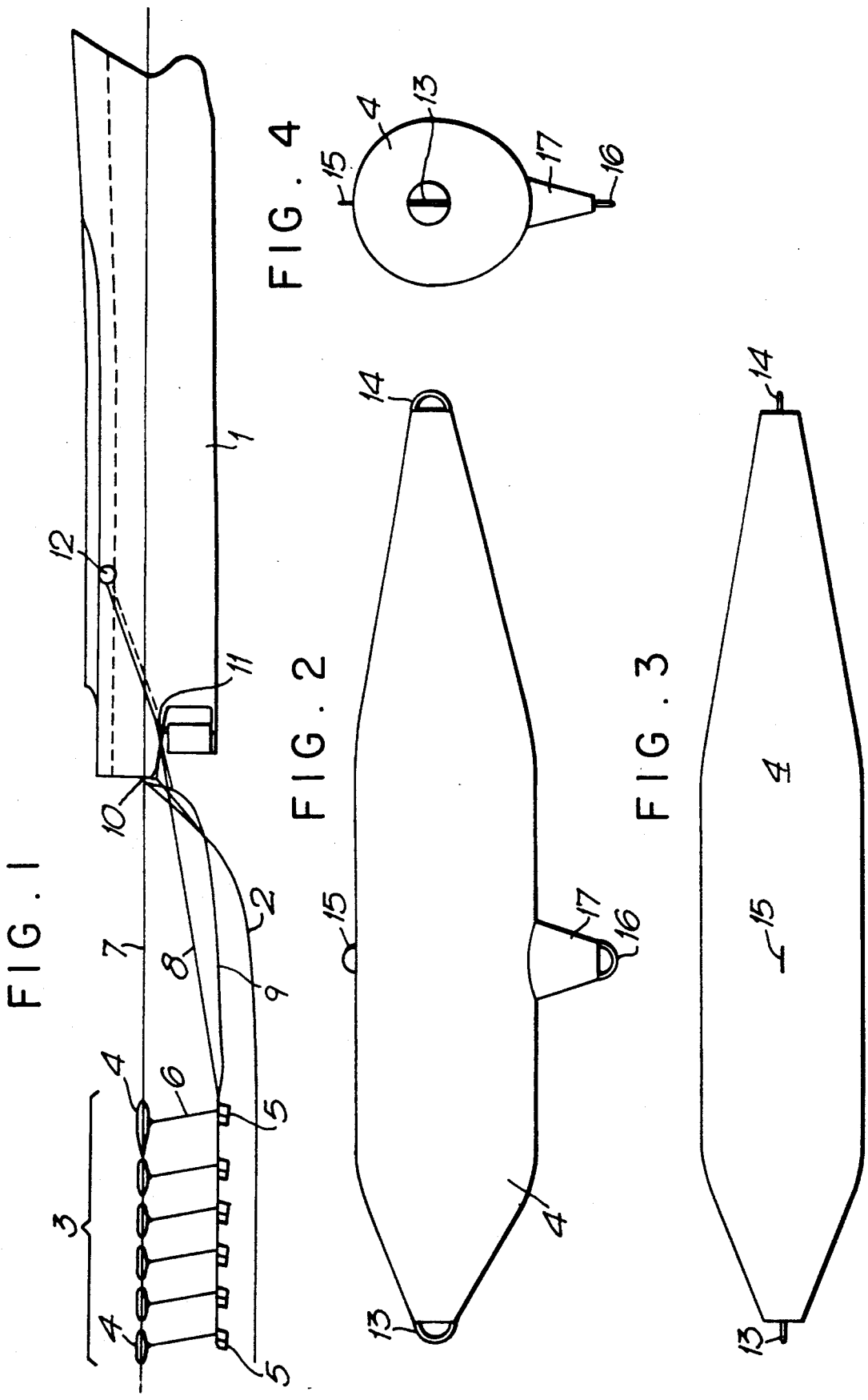

METHOD OF TOWING SOURCES OF SEISMIC ENERGY BEHIND A VESSEL, AND AN ARRANGEMENT FOR USE IN THE METHOD

BACKGROUND OF THE INVENTION

The invention relates to a method of towing sources of seismic energy behind a vessel, especially in seismic surveys in waters that are covered with ice, with a source of energy or arrays of sources of energy being suspended from buoyancy means which are towed behind the vessel. The invention also relates to an arrangement for use in the method.

When seismic surveys are carried out in waters that are covered with ice, other kinds of problems arise than those commonly encountered in seismic surveys at sea. Such problems are mainly caused by the ice and the noise generated by ice being broken up when the towing vessel is propulsed in order to permit seismic surveys to be made. Icebreaking causes noise of such a level that the seismic signals are no longer detectable in the streamer cable. These problems are avoided by carrying out measurements as disclosed in NO Patent Application Norwegian 90 1616 by the same applicant. Another problem prevailing in seismic surveys in waters which are covered with ice is connected with towing the sources of seismic energy. The sources of seismic energy which are towed behind the vessel are suspended on some kind of buoyancy means which maintain a plurality of sources of energy at a predetermined mutual distance in order to permit the sources together to emit a seismic impulse which is defined in the desired manner and is detected by the hydrophones of the streamer cable. In waters which are covered with ice, however, the buoyancy means for the sources of energy will be influenced by broken ice, which may partly damage them, but at least will cause interference of their advance. Ice may pile up in front of the buoyancy means and may hamper advance. Under the surface of the water such a pile-up may also disturb the suspension lines of the sources of energy, so that the latter are displaced from their correct position. Consequently, the seismic signals may be distorted and, thus, render recordings dubious.

BRIEF SUMMARY OF THE INVENTION

It is an object of the present invention to provide a method and arrangements to prevent such an influence on the sources of seismic energy and to ensure a maximum controlled and safe advance of the sources of energy behind a towing vessel.

The objects are achieved by a method and arrangements characterized by the novel features of this invention.

In the method according to the invention two towing cables are used, which will stabilize the system. The special arrangement of the towing cables, one of which, towing the buoyancy means, follows the waterline and is secured to the vessel in the area of the waterline, and the other second towing cable, being connected directly with the array of sources of energy, preferably air guns, is arranged as far as possible under water, provides for the safest possible towing conditions without influence by ice formations.

It is, in fact, previously known from U.S. Pat. No. 3,718,207 to tow a seismic source of energy by a cable from a location under water and directly to the source of energy, but this will not provide sufficient security for steady advance in waters which are covered with ice, so that a double system is, as mentioned, used in the present case. By designing the buoyancy means as described hereinafter ice floes are in the best possible manner cut or pushed aside, etc. At the same time the knife-like arrangement at the suspending location beneath the buoyancy means will prevent ice from piling up beneath the buoyancy means, which might otherwise lift the buoyancy means and the air guns so that the latter are displaced. In order to ensure that the souces of energy are kept in place and that their towing line has a direction which is as horizontal as possible, the fastening points of the towing line are provided as far as possible under the surface of water, and means to lower the fastening point on the vessel after launching the tow may suitably be used.

BRIEF DESCRIPTION OF THE DRAWINGS

The invention is disclosed in more detail below with reference to an embodiment shown in the accompanying drawing, wherein:

FIG. 1 is a schematic elevational view which shows diagrammatical sections of a towing vessel towing sources of seismic energy according to the invention;

FIG. 2 shows three is a side elevational view illustrating a buoyancy means designed according to the invention;

FIG. 3 is a top plan view of FIG. 2; and

FIG. 4 is a left end view of FIG. 2.

DETAILED DESCRIPTION

A towing vessel 1 is diagrammatically shown in FIG. 1. The towing vessel tows a seismic streamer 2 which is not disclosed in detail here, since it does not constitute part of the present invention. The towing vessel, furthermore, tows an array of sources of seismic energy which is generally designated by numeral 3. Said array of sources of seismic energy comprises an array of buoyancy means 4 and the sources of energy 5, which may be air guns, are suspended beneath said buoyancy means 4 by the aid of lines 6. The tow of sources of energy 3 is towed behind vessel 1 by the aid of two lines 7 and 8. One line 7 is secured to buoyancy means 4 on one side and to the vessel in the area of the waterline on the other end and the fastening point is generally indicated at 10 in the figure. Line 7 which may be a wirerope, preferably a chain, will thus extend in the area of the waterline and will cut or push aside any ice collected behind the vessel. The sources of seismic energy 5 are also connected with the vessel, via line 8, which is secured to the vessel at a location below the waterline and which is generally designated by numeral 11 in the figure. From the sources of seismic energy there are also connecting cables for operation of the sources which are designated 9. Cables 9 are of a conventional kind.

Line 8 may be introduced into the water through special ducts on the ship's side or through the ship's hull, which open below the waterline. Such duct members may be extendable or displaceable to permit regulation of the depth of towing point 11. The duct line 8 is connected with a winch means 12 for hauling in and paying out the towing line 8.

In order to minimize the influence of ice on buoyancy means 4 the latter may have a shape as illustrated in FIG. 2. The buoyancy means has a rounded shape with pointed front and rear ends. In the front and rear portions fastening lugs 13, and 14, respectively are integrated with the buoyancy means and are, preferably, vertical to be able to cut through any ice floes or the like. The towing line 7, preferably a chain to break up any drifting ice, is secured to front lug 13. To lug 14 a coupling means for the following buoyancy means 4 is secured, so that a series of buoyancy means which are close behind each other is provided. On the top of the buoyancy means a fastening lug is provided for lifting and lowering the buoyancy means. Below the buoyancy means a rigid and pointed fin-shaped fastening means 17, extending in the longitudinal plane of the buoyancy means is at its lower edge provided with an integrated fastening lug 16 for the suspension line leading to source of energy 5. When the buoyancy means are towed among drifting ice floes and crushed ice, part of such ice will collect below the buoyancy means, but will be crushed and pushed aside by said fin-like fastening means 17, so that ice will not affect the suspending lines 6 to any degree worth mentioning and interference with operations are substantially avoided. Said fin-like member in combination with use of two towing lines 7 and 8, is highly important to a steady advance of the sources of energy.

In the drawing only one embodiment of the invention is shown, but many modifications will be possible, based on local conditions and on the kind of towing vessel used. Such modifications are intended to be within the scope of the present invention. It should also be mentioned that there is nothing preventing the invention from being used in other waters than waters which are covered with ice, e.g. in places where drifting objects may be expected on the surface of the water, or the like.

I claim:

1. A method of towing sources of seismic energy behind a vessel during seismic recordings in waters covered with ice, wherein sources of seismic energy suspended from buoyancy means are towed in an array behind said vessel, comprising:
    towing said buoyancy means by a first towing line which is fastened at the level of the waterline to said vessel; and
    towing said array of seismic energy sources which are suspended from the underside of said buoyancy means by a second towing line which is fastened to said array at one end portion thereof and fastened at the other end portion to a towing point on said vessel below said waterline.

2. A method as claimed in claim 1, and further comprising: displacing said towing point on said vessel for said second towing line to a point below said waterline by displacement means before said towing.

3. A method as claimed in claim 1 wherein said first towing line is a wirerope.

4. A method as claimed in claim 1 wherein said first towing line is a chain.

5. A method as claimed in claim 2 wherein said first towing line is a wirerope.

6. A method as claimed in claim 2 wherein said first towing line is a chain.

7. A method as claimed in claim 2 wherein said displacement means is a hydraulic means.

8. A method as claimed in claim 2 wherein said displacement means is a mechanical means.

9. A method as claimed in claim 5 wherein said displacement means is a hydraulic means.

10. A method as claimed in claim 6 wherein said displacement means is a hydraulic means.

11. A method as claimed in claim 5 wherein said displacement means is a mechanical means.

12. A method as claimed in claim 6 wherein said displacement means is a mechanical means.

13. An arrangement for towing an array of seismic energy sources behind a vessel during seismic recordings and in waters covered with ice comprising:
    a buoyancy means having an underside, a longitudinal plane and pointed front and rear portions;
    substantially vertical front and rear fastening lugs on said front and rear portions respectively;
    seismic energy source means suspended below said buoyancy means;
    rigid fin-shaped fastening means extending downwardly from said underside of said buoyancy means and pointed in the direction of forward movement thereof;
    a lower edge on said fin-shaped fastening means;
    lower fastening lug means on said lower edge of said fin-shaped fastening means extending substantially vertically and substantially parallel with said longitudinal plane of said buoyancy means;
    suspension means connected to said lower fastening lug means of said buoyancy means and seismic energy source means for suspending said seismic energy sources from said buoyancy means;
    a first towing line having a rear end connected to said front fastening lug of said buoyancy means and a front end connected to said vessel at the level of the waterline; and
    a towing point on said vessel below said waterline; and
    a second towing line having a front end connected to said towing point and a rear portion connected to said seismic energy source means for towing said seismic energy source means below said waterline.

14. An arrangement as claimed in claim 13 wherein:
    said buoyancy means comprises a plurality of buoyancy members each having front and rear portions with respective front and rear fastening lugs thereon and connected end to end in a substantially linear spaced array:
    a said rigid fin-shaped fastening means having a said lower edge thereon is provided on each buoyancy member;
    a said lower fastening lug means is provided on each lower edge;
    a respective seismic energy source means is connected to each buoyancy means by a respective said suspension means;
    said first towing line is connected to said front end lug of the leading buoyancy means; and
    said rear portion of said second towing line is connected to said respective seismic energy sources to provide an array thereof.

15. An arrangement as claimed in claim 13 and further comprising:
    duct means on the aft end of said vessel having a lower end opening below said waterline and comprising said towing point, said second towing line extending through said duct means; and
    winch means on said vessel connected to said other end portion of said second towing line for selectively hauling in and paying out said second towing line.

16. An arrangement as claimed in claim 14 and further comprising:

duct means on the aft end of said vessel having a lower end opening below said waterline and comprising said towing point, said second towing line extending through said duct means; and winch means on said vessel connected to said other end portion of said second towing line for selectively hauling in and paying out said second towing line.

17. An arrangement as claimed in claim 15 wherein: said duct means comprises a duct having an adjustable angle for raising and lowering said towing point at said lower end thereof.

18. An arrangement as claimed in claim 16 wherein: said duct means comprises a duct having an adjustable angle for raising and lowering said towing point at said lower end thereof.

19. An arrangement as claimed in claim 15 wherein: said duct means comprises an extendable duct for raising and lowering said towing point at said lower end thereof.

20. An arrangement as claimed in claim 16 wherein: said duct means comprises an extendable duct for raising and lowering said towing point at said lower end thereof.

* * * * *